United States Patent
Ryu

(10) Patent No.: US 8,761,595 B2
(45) Date of Patent: Jun. 24, 2014

(54) CAMERA INCLUDING MOUNT FOR FLASH

(75) Inventor: Hun-young Ryu, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/301,879

(22) Filed: Nov. 22, 2011

(65) Prior Publication Data

US 2012/0315029 A1     Dec. 13, 2012

(30) Foreign Application Priority Data

Jun. 9, 2011 (KR) .................. 10-2011-0055740

(51) Int. Cl.
    *G03B 15/03*     (2006.01)

(52) U.S. Cl.
    USPC ...................... 396/198; 396/542; 348/371

(58) Field of Classification Search
    USPC ............................. 396/542, 198; 348/371
    See application file for complete search history.

(56) References Cited

U.S. PATENT DOCUMENTS

| | | | |
|---|---|---|---|
| 4,249,813 A * | 2/1981 | Nihei ........................... 396/203 |
| 4,306,791 A * | 12/1981 | Hashimoto et al. ........... 396/155 |
| 4,664,496 A * | 5/1987 | Shinoda et al. ............... 396/169 |
| 4,669,850 A * | 6/1987 | Uchiyama et al. ............. 396/61 |
| 5,130,741 A * | 7/1992 | Nishigaki et al. ............. 348/372 |
| 2005/0078955 A1* | 4/2005 | Yamada ........................ 396/180 |
| 2005/0237426 A1* | 10/2005 | Takashima et al. ........... 348/375 |
| 2007/0115386 A1* | 5/2007 | Wakabayashi ................ 348/362 |
| 2008/0164056 A1* | 7/2008 | Gettemy et al. .............. 174/260 |
| 2010/0013986 A1* | 1/2010 | Yamamoto .................... 348/375 |

* cited by examiner

*Primary Examiner* — Clayton E Laballe
*Assistant Examiner* — Fang-Chi Chang
(74) *Attorney, Agent, or Firm* — Drinker Biddle & Reath LLP

(57) ABSTRACT

A camera includes a circuit board that includes a plurality of terminals disposed on a top surface of the circuit board to correspond to connection terminals of an external flash, and a support unit that supports the circuit board.

12 Claims, 5 Drawing Sheets

CAMERA INCLUDING MOUNT FOR FLASH

CROSS-REFERENCE TO RELATED PATENT APPLICATION

This application claims the priority benefit of Korean Patent Application No. 10-2011-0055740, filed on Jun. 9, 2011, in the Korean Intellectual Property Office, the entire disclosure of which is incorporated herein by reference.

BACKGROUND

1. Field of the Invention

Embodiments relate to a camera including a mount for flash, and more particularly, to a camera that may be designed to have a simpler structure, a smaller size, and an improved electrical connection to an external flash.

2. Description of the Related Art

A flash of a camera is a device used in photography to produce a flash of light for a very short time to help illuminate a scene. A camera includes an exclusive terminal called a hot shoe in order to mount an external flash thereon, and if necessary, the camera uses the external flash mounted on the hot shoe to take a photograph.

A conventional terminal for mounting external flash on a camera requires various elements, such as a terminal pin supported by a spring and a wiring that connects the terminal pin and a circuit board, in order to establish an electrical connection between the external flash and the camera. The conventional terminal has disadvantages in that manufacturing costs are increased because the number of parts is high. Assembling is also difficult because of the terminal pin, the wiring, and the circuit board should be connected by soldering. Furthermore, it is difficult to miniaturize the camera because the conventional terminal is large.

SUMMARY

Embodiments provide a camera including a flash mount which may be designed to have a simple structure and a small size.

Embodiments also provide a camera including a flash mount which may ensure easy assembling by reducing the number of parts and maintain a stable electrical connection to the flash.

According to an embodiment, there is provided a camera including a circuit board that includes a plurality of terminals disposed on a top surface of the circuit board to correspond to connection terminals of an external flash and a support unit that supports the circuit board.

The support unit may include wing portions that protrude upward from both sides of the circuit board to support a connection unit of the external flash.

The camera may further include a spring that is disposed between the wing portions and the circuit board and that applies an elastic force to the connection unit of the external flash by being deformed when the connection unit of the external flash is inserted between the wing portions and the circuit board.

The spring may be connected to ground terminals that are formed on the circuit board.

The circuit board may further include a plurality of grooves that extend in an insertion direction of the connection unit of the external flash to guide movements of the connection terminals of the external flash when the connection unit of the external flash is inserted into the support unit.

The circuit board may further include a plurality of cut portions that allow the connection terminals of the external flash to be inserted thereinto when the connection unit is inserted into the support unit.

The circuit board may further include a plurality of guide patterns that extend in an insertion direction of the connection unit of the external flash and that are disposed along the top surface of the circuit board to be connected to the plurality of terminals to guide movements of the connection terminals of the external flash when the connection unit of the external flash is inserted into the support unit.

The circuit board may further include circuit patterns that have first ends connected to the terminals and second ends located on one edge of the circuit board.

The camera may further include a flexible circuit board that is connected to the second ends of the circuit patterns.

The second ends of the circuit patterns may be disposed at a front side of a case on which the support unit is installed, a first end of the flexible circuit board is connected to the second ends of the circuit patterns, and the flexible circuit board extends in an extension direction of the case.

BRIEF DESCRIPTION OF THE DRAWINGS

The above and other features and advantages will become more apparent by describing in detail exemplary embodiments with reference to the attached drawings in which.

DETAILED DESCRIPTION

Embodiments will now be described more fully with reference to the accompanying drawings, in which exemplary embodiments of the invention are shown.

Figure 1:
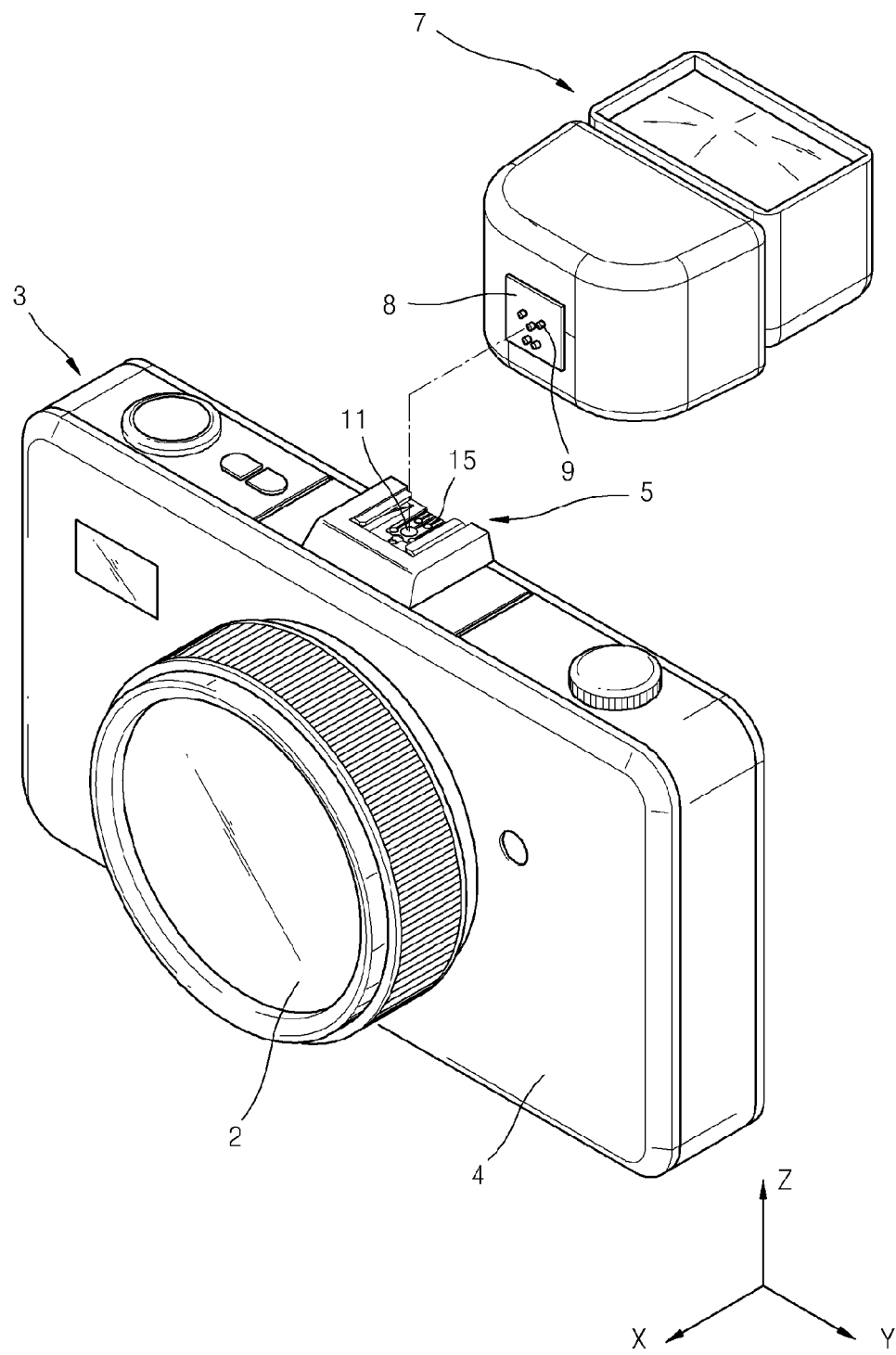
FIG. 1 is a perspective view illustrating a flash mounted on a camera according to an embodiment.

FIG. 1 is a perspective view illustrating an external flash 7 mounted on a camera 3 according to an embodiment.

Referring to FIG. 1, the camera 3 can include a lens unit 2 that can receive light of an image, and a case 4. A flash mount 5 on which the external flash 7 can be mounted is installed on a top surface of the case 4.

When the external flash 7 is mounted on the flash mount 5 of the camera 3, a connection unit 8 of the external flash 7 can be inserted into the flash mount 5.

The flash mount 5 can include a plurality of terminals 11 corresponding to connection terminals 9 of the external flash 7. When the flash mount 5 and the external flash 7 are coupled to each other, since the connection terminals 9 and the terminals 11 are electrically connected to each other, an electrical signal can be exchanged between the external flash 7 and the camera 3.

In order to mount the external flash 7 on the flash mount 5 of the camera 3, the connection unit 8 of the external flash 7 can be inserted into the flash mount 5 and can move in an X-axis direction from the back of the camera 3 toward the front of the camera 3. While the connection unit 8 of the external flash 7 can be inserted into the flash mount 5, the connection terminals 9 of the external flash 7 can move along grooves 15 of the flash mount 5. The grooves 15 of the flash mount 5 can guide movements of the connection terminals 9.

Figure 2:
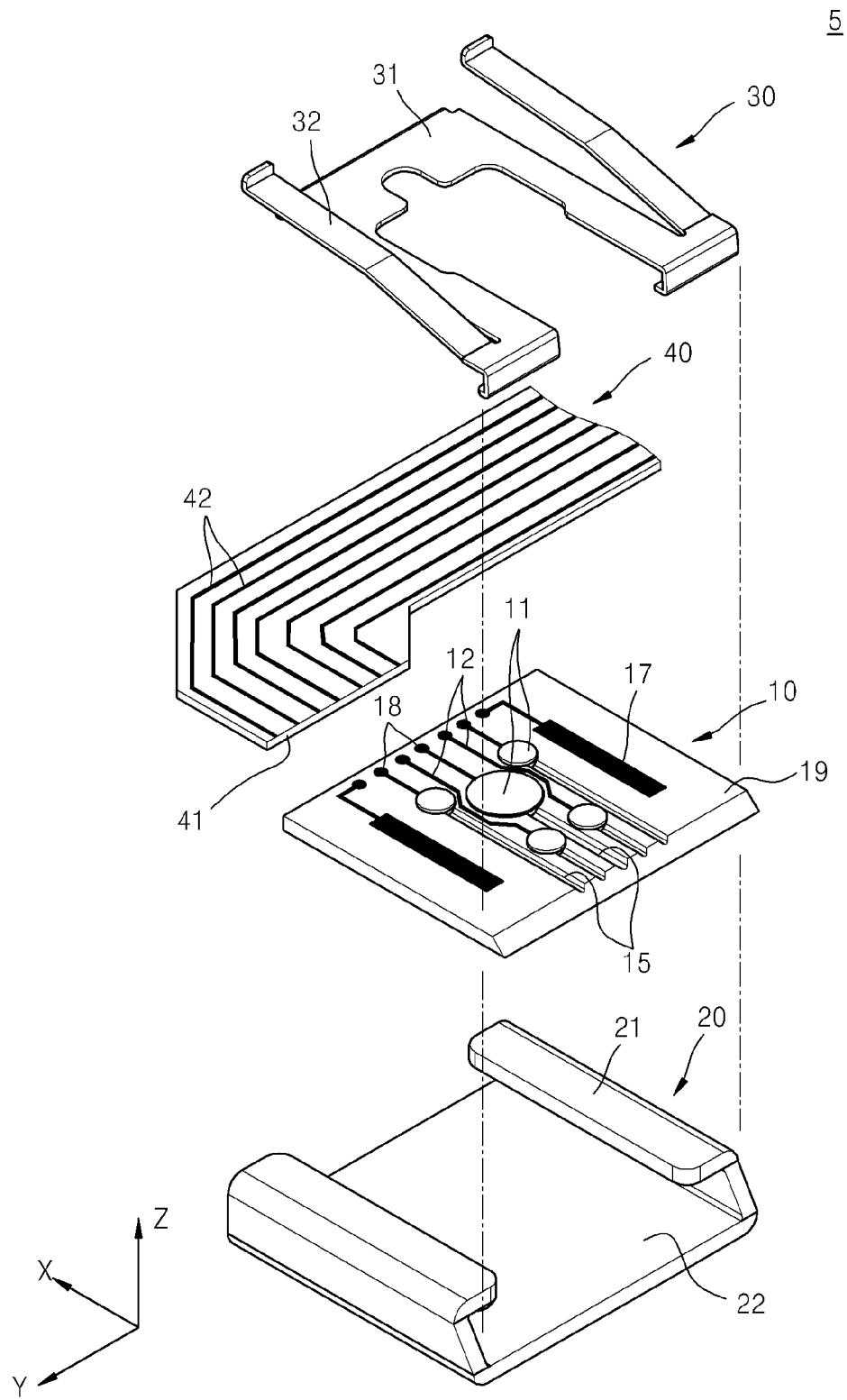
FIG. 2 is an exploded perspective view illustrating elements of a flash mount of the camera of FIG. 1.
Figure 3:
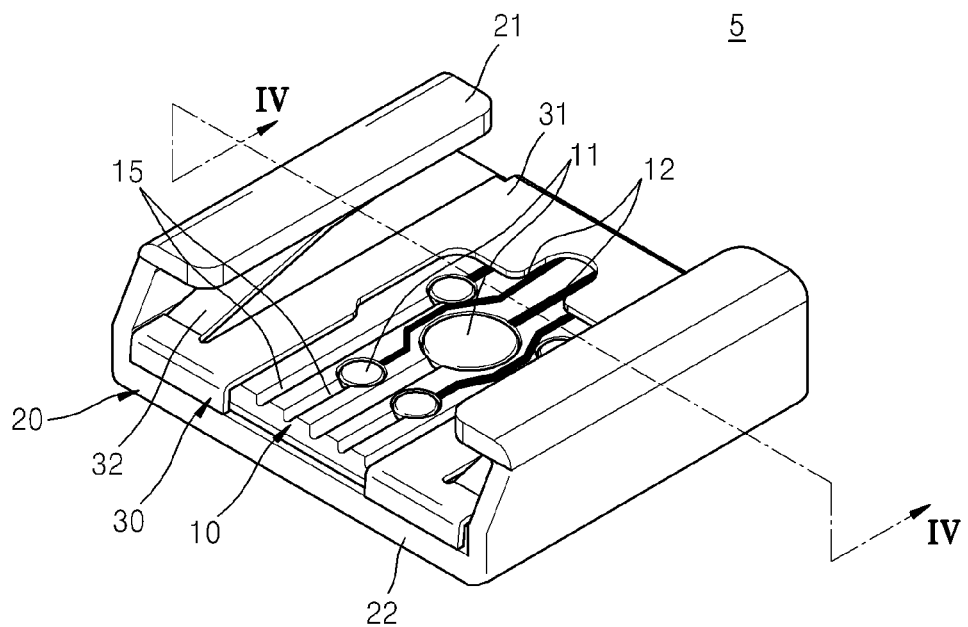
FIG. 3 is a perspective view illustrating a state where the flash mount of FIG. 2 is assembled.
Figure 4:
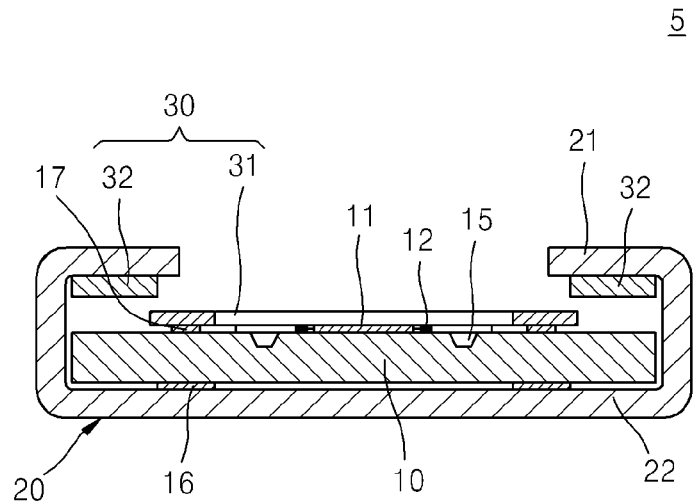
FIG. 4 is a cross-sectional view taken along line IV-IV of the flash mount of FIG. 3.

FIG. 2 is an exploded perspective view illustrating elements of the flash mount 5 of the camera 3 of FIG. 1. FIG. 3 is a perspective view illustrating a state where the flash mount 5 of FIG. 2 is assembled. FIG. 4 is a cross-sectional view taken along line IV-IV of the flash mount 5 of FIG. 3.

The flash mount 5 on which the external flash 7 is mounted can include a circuit board 10 that can include the plurality of terminals 11 disposed on a top surface thereof to correspond to the connection terminals 9 of the external flash 7, and a support unit 20 that can support the circuit board 10.

The support unit 20 can be installed on the camera 3 of FIG. 1, and can support other elements of the flash mount 5. The support unit 20 may be formed of a metal, a synthetic resin, or the like. The support unit 20 can include a base 22 that can support a bottom surface of the circuit board 10, and wing portions 21 that can protrude upward from both end portions of the base 22.

The circuit board 10 can include a substrate portion 19 that can be formed of an insulating material, the plurality of terminals 11 that can be formed on a top surface of the substrate portion 19, and circuit patterns 12 that can be electrically connected to the terminals 11 and can extend along the top surface of the substrate portion 19. First ends of the circuit patterns 12 can be connected to the terminals 11, and second ends of the circuit patterns 12 can be located on an edge of the circuit board 10.

The circuit patterns 12 may be formed on the substrate portion 19 by using various methods. For example, the circuit patterns 12 may be formed on the substrate portion 19 by using printing, plating, etching, or a combination thereof.

Surfaces of the terminals 11 of the circuit board 10 may be coated in order to improve durability. For example, the surfaces of the terminals 11 may be protected by using electrolytic hard gold plating. Electrolytic hard gold plating can involve performing gold plating on a surface of a metal and applying a brightener to make particle sizes very fine and grain boundaries dense, thereby improving the strength of the surface of the metal.

A flexible circuit board 40 can be electrically connected to connection terminals 18 formed on the second ends of the circuit patterns 12. The flexible circuit board 40 can include a substrate portion 41 that can be formed of a flexible insulating material and patterns 42 that can extend along the substrate portion 41. The flexible circuit board 40 can electrically connect the circuit board 10 and a control unit (not shown) of the camera 3.

A spring 30 may be disposed between the wing portions 21 of the support unit 20 and the circuit board 10. The spring 30 can include a coupled portion 31 that can be coupled to the circuit board 10, and elastically deformable portions 32 that can have first ends connected to the coupled portion 31 and second ends contacting the wing portions 21 of the support unit 20.

The elastically deformable portions 32 can be elastically deformed when being pressured by the connection unit 8 of the external flash 7 inserted between the wing portions 21 and the circuit board 10. The elastically deformable portions 32 can apply an elastic force to the connection unit 8 of the external flash 7 inserted between the wing portions 21 and the circuit board 10.

Ground terminals 17 can be formed on the top surface of the circuit board 10 to correspond to the coupled portion 31.

When the spring 30 is coupled to the circuit board 10, an electrical connection can be established between the coupled portion 31 and the ground terminals 17.

Ground terminals 16 may also be formed on the bottom surface of the circuit board 10 to contact the base 22.

Figure 5:
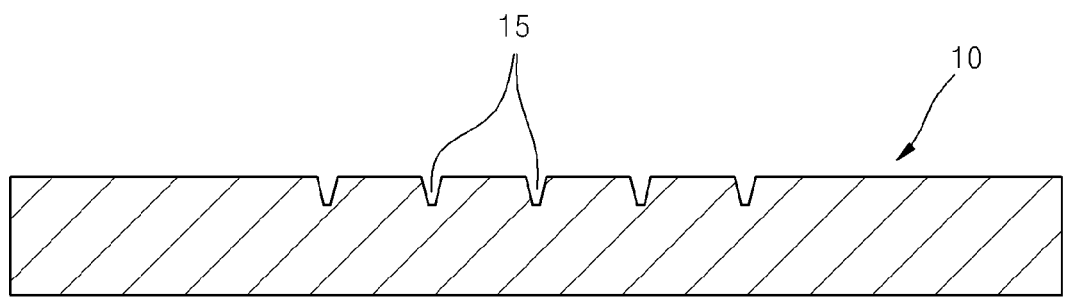
FIG. 5 is a cross-sectional view of a circuit board included in the flash mount of FIG. 4.

FIG. 5 is a cross-sectional view of the circuit board 10 included in the flash mount 5 of FIG. 4.

The plurality of grooves 15 can be formed in the top surface of the circuit board 10. The plurality of grooves 15 can guide the connection terminals 9 of the external flash 7 such that the connection terminals 9 of the external flash 7 can move along the top surface of the circuit board 10. The plurality of grooves 15 can extend in a movement direction (X-axis direction) of the connection unit 8 of the external flash 7.

The connection terminals 18 formed on the second ends of the circuit patterns 12 can be disposed at a front side of the case 4 of the camera 3. Referring to FIG. 2, the connection terminals 18 can be disposed at a back side of the circuit board 10 in an X-axis direction. A first end of the flexible circuit board 40 can be connected to the connection terminals 18, and the flexible circuit board 40 can extend in a Y-axis direction along an extension direction of the case 4.

Hence, when the flash mount 5 constructed as described above is mounted on the camera 3 of FIG. 1, since the flexible circuit board 40 can extend in the extension direction of the case 4 and can be received in the camera 3, a space for installing the flexible circuit board 40 may be minimized.

When the camera 3 including the flash mount 5 constructed as described above is used, since additional parts such as a pin for electrically connecting the external flash 1 to the camera 3 and a spring for supporting the pin are not necessary, assembling can be easy or easier and the camera 3 may be designed to be compact or more compact.

Also, a conventional method using a pin for electrically connecting the external flash 1 to the camera 3 can increase electrical resistance due to a contact between terminals. However, since the terminals 11 of the flash mount 5 according to an embodiment can be formed when the circuit patterns 12 are formed on the circuit board 10, electrical resistance may be greatly reduced, and thus, signal transmission accuracy may be improved.

Figure 6:
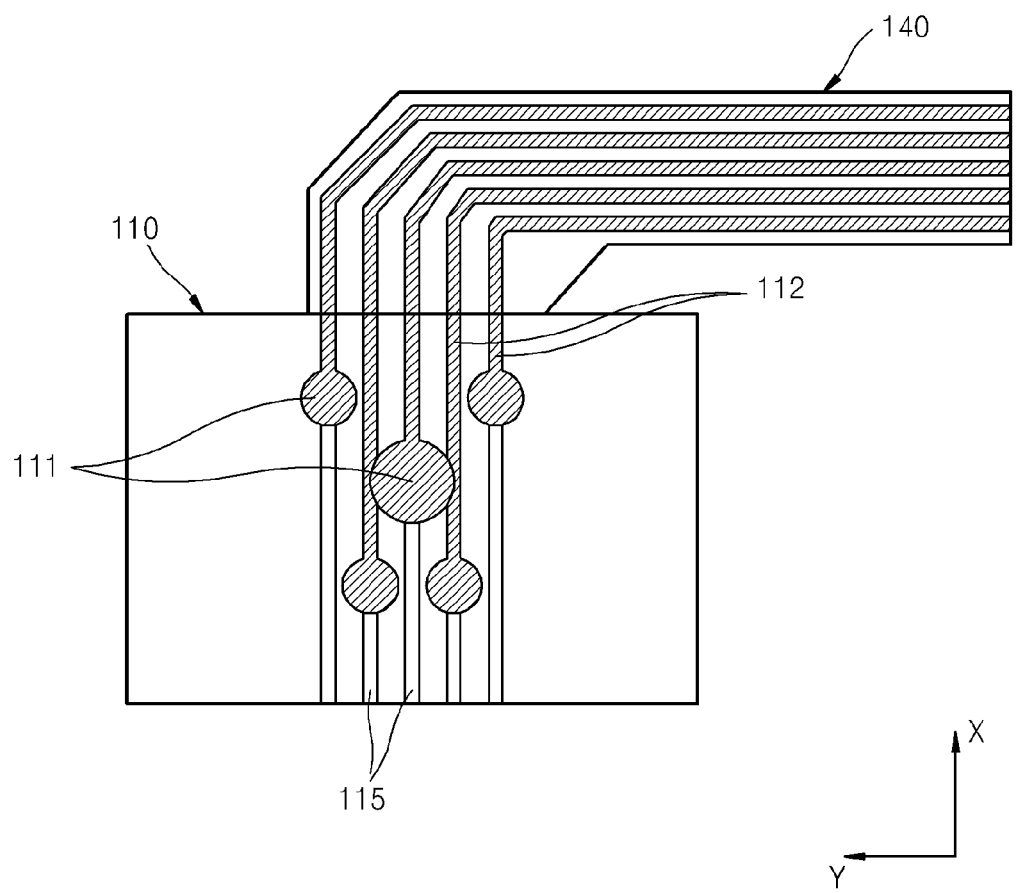
FIG. 6 is a plan view illustrating a circuit board of a mount for flash of a camera according to another embodiment.

FIG. 6 is a plan view illustrating a circuit board 110 of a flash mount of a camera according to another embodiment.

The flash mount of FIG. 6 can be wholly similar to the flash mount 5 of FIGS. 1 through 5 except for a structure of the circuit board 110.

A plurality of terminals 111 can be formed on a top surface of the circuit board 110, and circuit patterns 112 can be electrically connected to the terminals 111 and can extend along the top surface of the circuit board 110. First ends of the circuit patterns 112 can be respectively connected to the terminals 111, and second ends of the circuit patterns 112 can be located on an edge of the circuit board 110. A flexible circuit board 140 can be electrically connected to the second ends of the circuit patterns 112.

A plurality of guide patterns 115 can also be formed on the top surface of the circuit board 110. First ends of the guide patterns 115 can be respectively connected to the terminals 111, and second ends of the guide patterns 115 can be located on another edge of the circuit board 110.

The guide patterns 115 formed of the same material as that of the circuit patterns 112 and the terminals 111 may be formed when the circuit patterns 112 and the terminals 111 are formed on the circuit board 110. The guide patterns 115 constructed as described above can guide the connection unit 8 of the external flash 7 of FIG. 1 such that the connection unit 8 of the external flash 7 can move along the top surface of the circuit board 110.

Surfaces of the terminals 111, the guide patterns 115 on the circuit board 110, and so on may be protected by using, for example, electrolytic hard gold plating, in order to improve durability.

A first end of the flexible circuit board 140 can be connected to the second ends of the circuit patterns 112, and the flexible circuit board 140 can extend in a Y-axis direction that is an extension direction of the case 1 (see FIG. 1).

Figure 7:
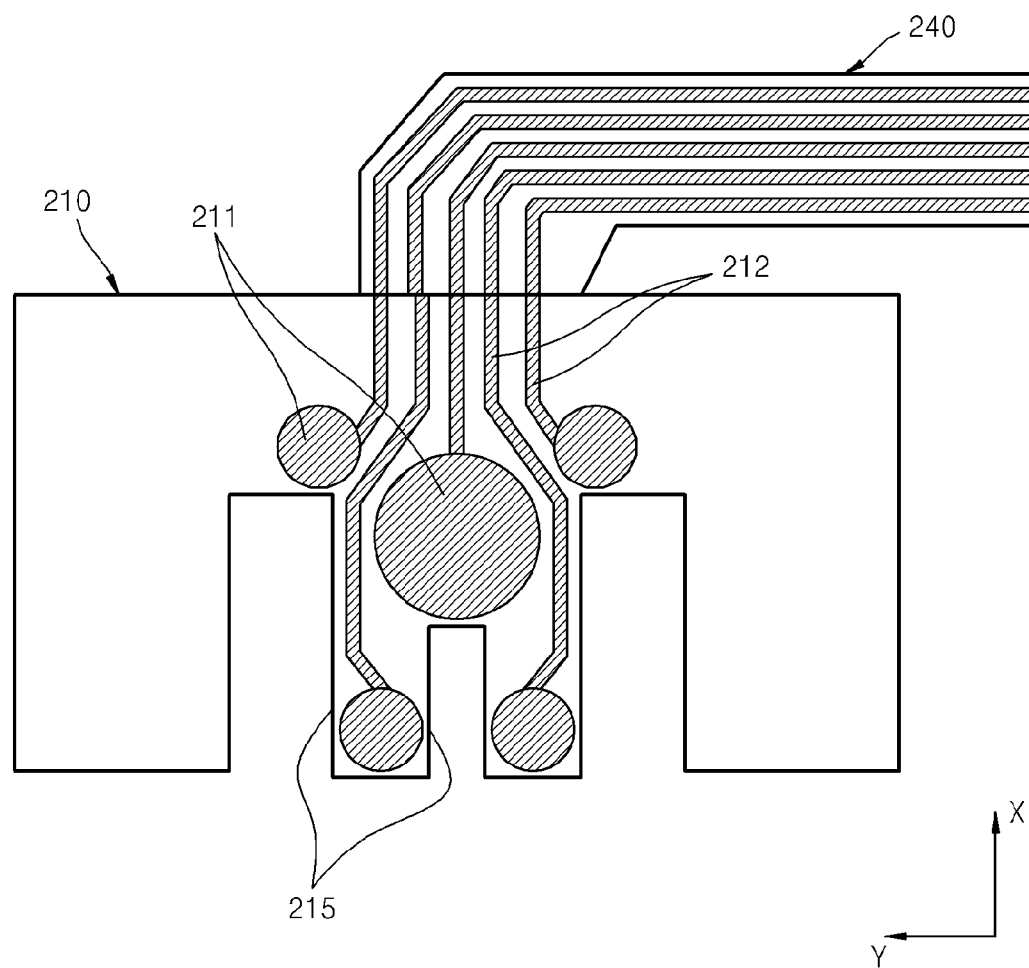
FIG. 7 is a plan view illustrating a circuit board of a mount for flash of a camera according to another embodiment.

FIG. 7 is a plan view illustrating a circuit board 210 of a flash mount of a camera according to another embodiment.

The flash mount of FIG. 7 can be wholly similar to the flash mount 5 of FIGS. 1 through 5 except for a structure of the circuit board 210.

A plurality of terminals 211 can be formed on a top surface of the circuit board 210, and circuit patterns 212 can be electrically connected to the terminals 211 and can extend along the top surface of the circuit board 210. First ends of the circuit patterns 212 can be connected to the terminals 211, and second ends of the circuit patterns 212 can be located on an edge of the circuit board 210. A flexible circuit board 240 can be electrically connected to the second ends of the circuit patterns 212.

The circuit board 210 can include a plurality of cut portions 215 formed in another edge of the circuit board 210. The cut portions 215 can extend from the another edge of the circuit board 210 to a place adjacent to the terminals 211. The cut portions 215 can guide the connection unit 8 of the external flash 7 of FIG. 1 such that the connection unit 8 of the external flash 7 can move along the top surface of the circuit board 210.

A first end of the flexible circuit board 240 can be connected to the second ends of the circuit patterns 212, and the flexible circuit board 240 can extend in a Y-axis direction that is an extension direction of the case 1 (see FIG. 1).

As described above, since a camera according to one or more embodiments may not require additional parts, such as, a pin for electrically connecting an external flash to the camera and a spring for supporting the pin, assembling is easy and the camera may be designed to be compact or more compact.

While a conventional method using a pin for electrically connecting the camera and an external flash can increase electrical resistance due to a contact between terminals, since terminals of a flash mount according to the one or more embodiments can be formed when circuit patterns are formed on a circuit board, electrical resistance may be greatly reduced and thus signal transmission accuracy may be increased.

The apparatus described herein may include a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Also, using the disclosure herein, programmers of ordinary skill in the art to which the invention pertains can easily implement functional programs, codes, and code segments for making and using the invention. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprises," "comprising," "includes," "including," "has," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention. Therefore, the scope of the invention is defined not by the detailed description of the invention but by the following claims, and all differences within the scope will be construed as being included in the invention.

What is claimed is:

1. A camera comprising:
    a circuit board that comprises a substrate portion formed of an insulating material and a plurality of terminals formed on a top surface of the substrate portion to correspond to connection terminals of an external flash; and
    a support unit that supports the circuit board;
    wherein the support unit comprises wing portions that protrude upward from both sides of the circuit board to support a connection unit of the external flash;
    wherein the camera further comprises a spring that is disposed between the wing portions and the circuit board and that applies an elastic force to the connection unit of the external flash by being deformed when the connection unit of the external flash is inserted between the wing portions and the circuit board;
    wherein the circuit board further comprises ground terminals formed on a bottom surface of the substrate portion of the circuit board to contact a base of the support unit.

2. The camera of claim 1, wherein the circuit board further comprises a plurality of cut portions that allow the connection terminals of the external flash to be inserted thereinto when the connection unit is inserted into the support unit.

3. The camera of claim 1, wherein the circuit board further comprises a plurality of guide patterns that extend in an insertion direction of the connection unit of the external flash and that are formed along the top surface of the circuit board to be connected to the plurality of terminals to guide movements of the connection terminals of the external flash when the connection unit of the external flash is inserted into the support unit.

4. The camera of claim 1, wherein the circuit board further comprises circuit patterns that have first ends connected to the terminals and second ends located on one edge of the circuit board.

5. The camera of claim 4, further comprising a flexible circuit board that is connected to the second ends of the circuit patterns.

6. The camera of claim 5, wherein the second ends of the circuit patterns are disposed at a front side of a case on which the support unit is installed, a first end of the flexible circuit board is connected to the second ends of the circuit patterns, and the flexible circuit board extends in an extension direction of the case.

7. The camera of claim 4, wherein the circuit patterns comprise at least one of printed circuit patterns, plated circuit patterns, or etched circuit patterns.

8. The camera of claim 7, wherein the plurality of terminals are formed when the circuit patterns are formed on the circuit board.

9. The camera of claim 1, wherein the connection terminals of the external flash engage the plurality of terminals formed on the top surface of the substrate portion of the circuit board when the connection unit of the external flash is inserted.

10. The camera of claim 1, wherein the circuit board and the support unit are installed on a top surface of a case of the camera.

11. The camera of claim 1, wherein the circuit board further comprises a plurality of grooves that extend in an insertion direction of the connection unit of the external flash to guide movements of the connection terminals of the external flash when the connection unit of the external flash is inserted into the support unit.

12. The camera of claim 11, wherein the connection terminals of the external flash can move along the plurality of grooves of the circuit board when the connection unit of the external flash is inserted.

* * * * *